United States Patent Office 3,112,210
Patented Nov. 26, 1963

3,112,210
PROCESS FOR THE MANUFACTURE OF CERAMIC GRADE TITANIUM DIOXIDE
Clifford Le Roy Carpenter, Wellesley, Mass., assignor to Cabot Corporation, Boston, Mass., a corporation of Delaware
No Drawing. Filed July 21, 1961, Ser. No. 125,637
4 Claims. (Cl. 106—300)

This application relates to titanium dioxide and in particular to a process for producing improved pellets of titanium dioxide.

It would be most desirable in the manufacture of frits for the ceramics industry, to utilize certain small particle size titanium dioxide products, such as off-grade opacity type titanium dioxide. Accordingly, many attempts have been made to pelletize or agglomerate titanium dioxide having a particle diameter on the order of for example, 200–700 m$\mu$ to produce pellets having an equivalent spherical diameter of between about 7 and 20 microns which would be suitable for use in the manufacture of frits. Such attempts have been largely unsuccessful because the pellets heretofore produced did not have sufficient strength and internal cohesiveness and accordingly, fractured and broke down extensively into undersized fragments during the dry blending operations involved in the manufacture of frits. In accordance with the present invention, however, there are produced pellets of titanium dioxide having a particle diameter of between about 7 and 20 microns which have sufficient strength to be suitable for the manufacture of frits.

Accordingly, it is a principal object of the present invention to provide an improved process for producing titanium dioxide pellets.

It is another object of the present invention to provide a process for producing titanium dioxide pellets suitable for use in the manufacture of frits.

It is still another object of this invention to provide an improved process for producing from titanium dioxide having a particle size on the order of between about 200 and 700 m$\mu$, titanium dioxide pellets suitable for use in the production of frits.

Other objects will in part appear hereinafter and will in part be obvious.

In accordance with the preferred embodiment of the present invention, it was discovered that when conventional titanium dioxide pellets having an equivalent spherical diameter of between about 7 and about 20 microns and containing 0.02 to 1% by weight moisture are treated by being contacted with a halide of a metal, preferably titanium tetrachloride in vapor form, the resulting pellets are greatly superior in strength and cohesiveness to the untreated titanium dioxide pellets.

It is believed, but there is no intention to be bound by this explanation, that when titanium dioxide pellets containing a small quantity of moisture are contacted with titanium tetrachloride (or other hydrolyzable metal halide), preferably in vapor form, hydrolyzation of the titanium tetrachloride (or other metal halide) occurs within the interstices of the pellets with the formation of additional titanium dioxide (or other metal oxide) therein, which additional titanium dioxide (or other metal oxide) acts as a binder, thereby increasing the strength of the pellets.

Titanium dioxide suitable for the purposes of the present invention can be produced in many ways for example by wet precipitation, such as from a solution of titanyl sulfate, or by pyrogenic processes such as suggested by Gosta Flemmert in "Studies on Inorganic Fillers," published in 1953 by Dalarnes Tiduings-Och Boktryckeri-AB, Sweden, or by United States Patents 2,488,439, 2,488,440 and 2,980,509. Opacity grade titanium dioxide, that is, titanium dioxide having a particle size between about 200 and 700 m$\mu$ is in general preferred in the practice of the present invention, although, the present invention is not limited thereto.

The manner in which the conventional titanium dioxide pellets are produced is not generally critical so long as the bulk of pellets is of about the desired size. Thus, the pellets can be produced by either dry or wet pelletizing procedures. Pelletizing of the titanium dioxide, for example, by being rolled in a drum with a minor amount of water or water vapor is preferred, however, as additional operations to impregnate the pellets with moisture subsequent to pelletization are thereby avoided. The moisture content of the pellets to be contacted with titanium tetrachloride is, however, critical. The ultimate strength of the treated pellets having a moisture content below about 0.02% by weight is not substantially improved by subsequent contact with titanium tetrachloride. On the other hand, a moisture content higher than about 0.5% by weight becomes wasteful in the use of the treating agent and does not produce a significantly improved product. Accordingly, a moisture content of between about 0.05% and 0.3% by weight of the pellets is preferred.

Likewise, the manner in which the moisture containing pellets are contacted with the metal halide is not critical. The operation can be accomplished for example, in a mechanical blender, or in a fluidized or dense phase bed reactor by contacting the pellets with a metal halide in liquid form or most preferably, with metal halide vapors either in pure or diluted form or carried by any inert gaseous medium such as a stream of hydrogen or nitrogen. Although the halides titanium, zirconium, silicon, aluminum and chromium can be utilized in the practice of the present invention, titanium halides and specifically titanium tetrachloride is greatly preferred because titanium tetrachloride is easy to use and because the use of titanium tetrachloride results in the production of pellets of pure titanium dioxide. Purity is a major consideration in the production of ceramic and therefore uncontaminated pellets of pure titanium dioxide are at a premium.

The reaction between the titanium tetrachloride and the moisture goes substantially to completion at room temperatures and it is only necessary to provide for thorough contact between the moisture containing pellets and the titanium tetrachloride. Accordingly, this can be accomplished in the case of titanium tetrachloride at room temperature by contacting said pellets with liquid titanium tetrachloride or with an inert carrier gas such as nitrogen containing titanium tetrachloride vapors. Obviously, higher temperatures can be utilized if desired. When metal halides other than titanium tetrachloride are utilized, however, higher temperatures are generally required when vapors are to be utilized. In the case of aluminum trichloride, for example, temperatures of at least about 350° F. are required to maintain pure aluminum trichloride in vapor form, although temperatures lower than about 350° F., e.g. about 280° F., can be utilized if a carrier gas is employed or if the treatment is accomplished at lower than atmospheric pressure.

The strength of the pellets produced is most easily varied by controlling the moisture content of the pellets which is controlled by (a) the conditions under which the particulate titanium dioxide is produced, (b) the quantity of water utilized during the pelletization procedure, and (c) the conditions to which the pellets are exposed after being produced but prior to being contacted with the titanium tetrachloride, e.g. water can be extracted from the pellets by warming and/or applying a partial vacuum to same. The strength of the pellets can also be varied by controlling the relative quantity of titanium tetrachloride contacted with the pellets, but control of the moisture content of the pellets is easier and is accordingly preferred.

There follow a number of non-limiting illustrative examples:

*Example 1*

Pelllets having an average diameter of about 10 microns are formed from titanium dioxide having an average particle diameter between about 200 and 500 millimicrons and a moisture content of about 0.08% by weight. These pellets have a crushing strength measured as the point at which the pellets begin to disintegrate of about 200 ft. lbs./in.$^2$. These pellets are exposed for about 1½ hours to an atmosphere of nitrogen which has been saturated at ambient conditions with titanium tetrachloride vapor. The resulting pellets have a crushing strength of about 600 ft. lbs./in.$^2$.

*Example 2*

The pellets to be treated in this example are essentially similar to the pellets treated in Example 1 except that these pellets have a moisture content of about 0.15% by weight, and a crushing strength of about 250 ft. lbs./in.$^2$. After exposure for about 1½ hours to an atmosphere of helium, which had been saturated at a temperature of about 80° F. with silicon tetrachloride vapors, the pellets are found to have a crushing strength of about 800 ft. lbs./in.$^2$.

*Example 3*

The pellets to be treated in this example are essentially similar to the pellets treated in Example 1 except that these pellets have a moisture content of about 0.37% by weight and a crushing strength of about 300 ft. lbs./in.$^2$. In this example, the pellets are exposed for about 3½ hours to an atmosphere of nitrogen which has been saturated at a temperature of about 100° F. with titanium tetrachloride vapor. The resulting pellets have a crushing strength of about 1000 ft. lbs./in.$^2$.

*Example 4*

Pellets having an average diameter of about 15 microns and a crushing strength of about 200 ft. lbs./in.$^2$ are formed from titanium dioxide having an average particle diameter of between about 200 and 500 millimicrons and a moisture content of about 0.01% by weight. The pellets are then exposed at ambient conditions to an atmosphere of air saturated with water vapor for ½ hour, after which the moisture content of the pellets has risen to about 0.11% by weight. These pellets were then exposed at ambient conditions for about 1½ hours to an atmosphere of nitrogen saturated at a temperature of about 100° F. with titanium tetrachloride vapors. The resulting pellets have a crushing strength of about 700 ft. lbs./in.$^2$.

Obviously many changes may be made in the above description and examples without departing from the scope of the invention. Therefore, it is intended that the above description and examples be regarded as illustrative and as not limiting the scope of the invention.

What I claim is:

1. A process for increasing the cohesiveness and strength of pellets of titanium dioxide, which comprises adjusting the moisture content of said pellets to between about 0.02 and 1% by weight, and exposing said pellets to a substance in vapor form chosen from the group consisting of the halides of titanium, zirconium, silicon, chromium, and aluminum.

2. The process of claim 1 wherein said substance is titanium tetrachloride.

3. The process of claim 1 wherein the moisture content of said pellets is adjusted to between about 0.02 and 0.5% by weight.

4. The process of claim 1 wherein said substance is silicon tetrachloride.

References Cited in the file of this patent

UNITED STATES PATENTS 2,760,846     Richmond et al. _____ Aug. 28, 1956

OTHER REFERENCES

"Titanox TG," Titanium Pigment Corporation pamphlet, 12 pages, first printing July 1949.